June 16, 1931.  E. M. TUCKER  1,810,505
POWER DRIVEN SNOW VEHICLE
Filed March 26, 1928   2 Sheets-Sheet 1
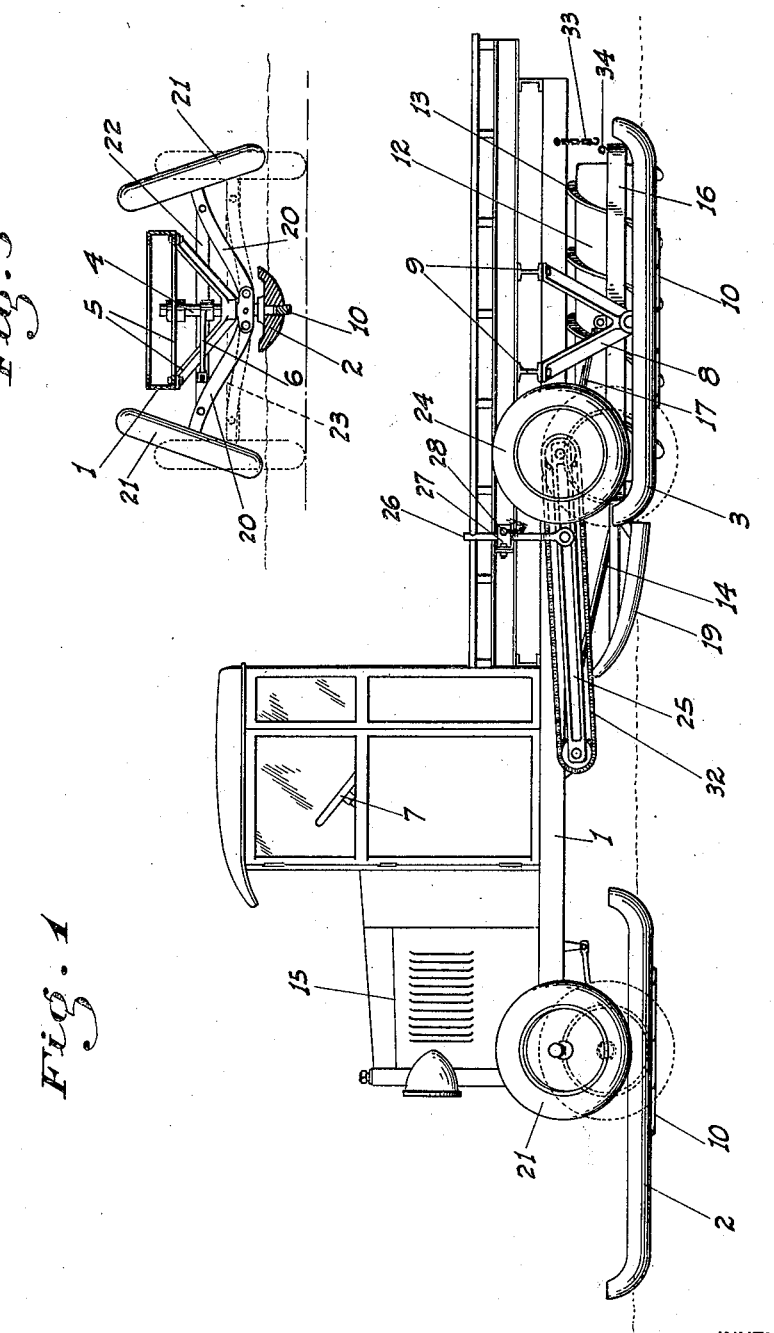
INVENTOR
E. M. Tucker
BY
ATTORNEY

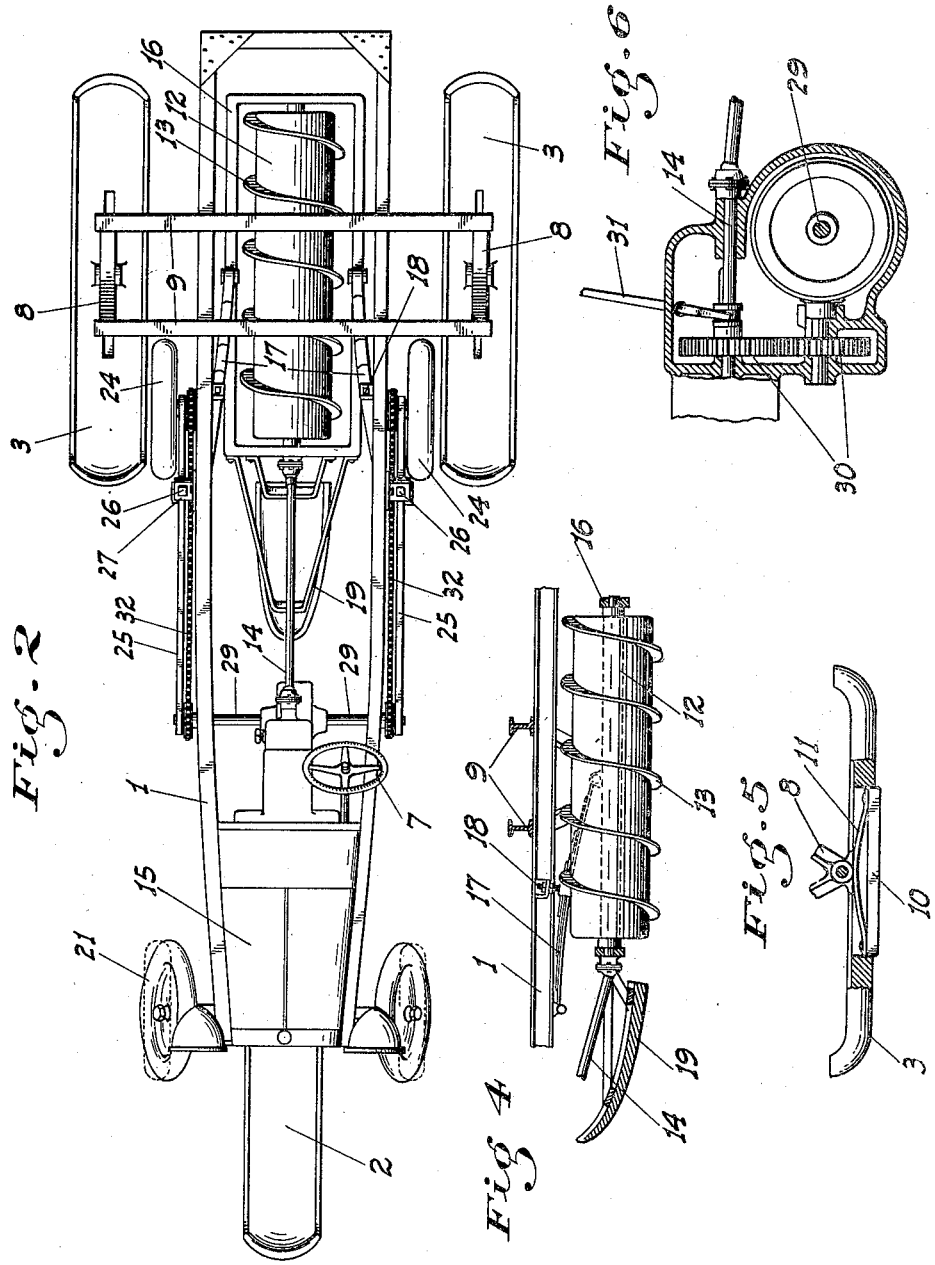

Patented June 16, 1931

1,810,505

UNITED STATES PATENT OFFICE

EMMITT M. TUCKER, OF MEDFORD, OREGON

POWER DRIVEN SNOW VEHICLE

Application filed March 26, 1928. Serial No. 264,720.

This invention relates to automotive road vehicles and particularly one for use in traveling over snow.

The principal object of my invention is to provide a vehicle of this general character having supporting and propelling means so arranged that the vehicle can operate in snow of any depth and can travel at speeds corresponding to those of ordinary automobiles, with a power plant of the same character and power.

A further object of the invention is to provide the vehicle with normally raised wheels which are adapted to be lowered when dry ground is encountered, and to provide so that said wheels may be driven and steered, so that the vehicle can be operated on dry ground in the same manner as an ordinary car.

These objects I accomplish by means of such structure and relative arrangement of parts as will fully appear by a perusal of the following specification and claims.

In the drawings similar characters of reference indicate corresponding parts in the several views:

Fig. 1 is a side elevation of my improved snow vehicle.

Fig. 2 is a top plan view of the same with the body parts removed.

Fig. 3 is a fragmentary front end view showing the mounting of the front steering runner and wheels.

Fig. 4 is a side elevation of the propelling cylinder and adjacent parts.

Fig. 5 is a side elevation mainly in section of a side runner.

Fig. 6 is a sectional elevation of the driving connections between the cylinder and wheel drive means.

Referring now more particularly to the characters of reference on the drawings, the numeral 1 denotes the main frame of the vehicle, which is similar to that of an ordinary motor vehicle and on which the body and power plant are mounted. This frame is supported at its front end on a relatively long skid or runner wing disposed centrally over and projecting ahead of the frame, and toward the rear by transversely spaced side runners 3.

The forward runner is secured to a vertical stem 4 which is journaled in and supported by a bracket structure 5 depending from the front end of the frame 1. An arm 6 projects laterally from the stem so as to enable steering connections to be made with the steering wheel 7 of the vehicle by means of a suitable mechanism of the type commonly used for the purpose. The rear runners are supported some distance outwardly of the sides of the frame by rigid V shaped brackets 8 pivoted thereon and depending from transverse beams 9 mounted on the frame. All the runners have relatively short centrally disposed keels 10 depending therefrom and vertically slidable therein, being yieldably pressed down by springs connected to the runners and to the keels at their ends. These keels prevent lateral slipping of the runners and yet can move up out of the way when striking any solid construction which might tend to damage them.

The propelling structure of the vehicle comprises a longitudinally extending cylinder or drum 12 adapted to rest on the snow between the runners 3, said cylinder having an outwardly projecting screw spiral 13 of predetermined pitch and depth extending therealong from end to end. This cylinder is connected to and rotated by an ordinary swivel jointed propeller shaft structure 14 which leads from the power plant of the vehicle, which power plant as usual is mounted in its customary location under the hood 15 at the front end of the frame. The cylinder is preferably mounted in a horizontal frame 16 extending thereabout, which frame is connected to the rear ends of cantilever springs 17 which at their forward ends are connected to the vehicle frame. The arrangement of these springs is such that they press the frame 16, and consequently the cylinder into yielding engagement with the snow.

These springs also act as torque or tension arms, preventing lateral deflection of the cylinder and relieving the tension on the propeller shaft. In order to enable the pressure of the springs against the cylinder frame to be altered, adjustable screws 18 are mounted on the frame 1 and bear down against the spring intermediate their ends as shown in Fig. 4. Mounted in connection with the cylinder at its forward end and projecting ahead of the same for some distance in longitudinally alined relation therewith is an auxiliary runner 19, preferably having an upward slope toward its forward end. The bottom of this runner at the rear is level with the bottom of the cylinder, and the transverse curvature of the bottom of said runner is the same as that of the cylinder.

The forward runner 2 is also longitudinally alined with the cylinder and has the same transverse bottom curvature as said cylinder. The pivotal stem of the front runner is set as far toward the rear end of said runner as is practicable so as not to throw the runner greatly out of line with the cylinder when the runner is turned laterally for steering the vehicle. As a result of this arrangement it will be seen that the vehicle is supported on the snow independently of the cylinder, and the pressure of the latter against the snow is governed by its own weight and by the action of the springs 17. The front runner, engaging the snow ahead of the cylinder and being pressed down by the weight of the front end of the vehicle, packs the snow and makes a curved trough into which the cylinder projects. The runner 19 further packs the snow in the trough already made by the front runner before the cylinder itself engages said trough.

The cylinder therefore engages a packed and substantially solid surface, regardless of the actual natural condition of the snow itself, so that when the spiral of the cylinder cuts into the snow, sufficient resistance is offered to cause the vehicle to be advanced without any appreciable slipping or churning movement of the cylinder in the snow being had. The solid pack depth of snow in which the machine can operate is limited only by the depth of the spiral on the cylinder, which I have found from experience to give good results if made about 2 inches deep.

In order to enable the vehicle to travel over dry ground when necessary I provide the following arrangement: Pivoted on and projecting laterally from the stem 4 of the front runner are arms 20 on the outer ends of which are mounted ordinary wheels 21. These arms are coupled together to hold the wheels raised above the runners by a detachable link 22; and when in their lowered position, so as to cause the wheels to be lower than the runners, said arms are coupled by another longer link 23 or by some other suitable means. These wheels being connected to the turnable runner stem, can be steered by the same mechanism as is used to steer the runner.

To support the rear end of the vehicle I provide a pair of rear side wheels 24, preferably disposed between the runners 3 and the sides of the frame ahead of the brackets 8. These wheels are mounted on arms 25 which extend forwardly and are pivoted at their forward ends onto the frame 1. These arms are connected to rigid vertical members 26 which are slidable through supports 27 on the frame 1. Heavy pins 28 are mounted in said supports and engage vertically spaced notches in the members 26 to hold the matter immovable, thus enabling the arms 25 to be held so that the wheels will be above the runners or below the same as may be desired.

Lateral shafts 29 are connected to the arms in common with their pivotal connections with the frame, said shafts being connected in driving relation with the cylinder propeller shaft 14 by gears 30. One such gear is slidable on its shaft, and is moved in or out of engagement with the other gear by a shifting lever 31. This structure is preferably mounted in connection with the ordinary transmission mechanism from which the propeller shaft 14 projects, so that different speeds may be imparted to the propeller shaft and the shafts 29. At their outer ends the shafts 29 are connected with the wheels by chain or other suitable drive means 32. To hold the cylinder from contact with the ground when the wheels are supporting the vehicle, and without depending on the springs 17, I may mount chains 33 or the like on the frame 1 to detachably engage eyes 34 on the rear of the cylinder frame 16. When raising or lowering the wheels ordinary jacks are preferably used to support the frame of the machine at the desired level while the wheels are being moved from one position to another.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A power driven snow vehicle including a frame, a driven screw cylinder extending lengthwise of the frame, means flexibly supporting the cylinder from the frame to enable said cylinder to yieldably engage the snow, a runner mounted in rigid connection with the frame ahead of and longitudinally alined with the cylinder to pack the snow ahead of the cylinder, and a further runner mounted in fixed connection with the cylinder supporting means ahead of the same and arranged to further pack the snow in the path of the cylinder.

2. A snow vehicle including a frame, runners for supporting the frame from the snow mounted in fixedly spaced relation thereto, rear wheels vertically adjustable relative to the frame for supporting the rear end of the same from the ground, front wheels for supporting the front end of the frame from the ground, transversely extending axle members on the outer ends of which the front wheels are mounted, pivotal supporting connections for the adjacent ends of the axles to permit the same to swing in a vertical plane transversely of the vehicle, and detachable link means for holding said axle members rigid with each other when fully raised or lowered.

In testimony whereof I affix my signature.

EMMITT M. TUCKER.